(12) United States Patent
Hutchinson

(10) Patent No.: US 6,738,098 B1
(45) Date of Patent: May 18, 2004

(54) VIDEO AMPLIFIER WITH INTEGRATED DC LEVEL SHIFTING

(75) Inventor: Daniel Mark Hutchinson, Carmel, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/806,215

(22) PCT Filed: Sep. 30, 1999

(86) PCT No.: PCT/US99/22759

§ 371 (c)(1),
(2), (4) Date: Mar. 27, 2001

(87) PCT Pub. No.: WO00/19709

PCT Pub. Date: Apr. 6, 2000

Related U.S. Application Data

(60) Provisional application No. 60/102,429, filed on Sep. 30, 1998.

(51) Int. Cl.[7] .............................. H04N 5/16; H04N 5/18; H04N 9/72
(52) U.S. Cl. ........................ 348/691; 348/257; 348/694; 348/695
(58) Field of Search .................................. 348/691, 692, 348/693, 694, 695, 696, 697, 698, 257; H04N 5/16, 5/18, 9/72

(56) References Cited

U.S. PATENT DOCUMENTS 3,558,816 A   1/1971 Wise et al.
3,578,900 A   5/1971 Willis et al.

(List continued on next page.)

FOREIGN PATENT DOCUMENTS

| EP | 0359493 | 3/1990 | .......... H04N/17/02 |
| EP | 0567343 | 10/1993 | .......... H04N/17/04 |
| EP | 0774866 | 5/1997 | ............ H04N/5/44 |
| WO | 98/32279 | 7/1998 | .......... H04N/17/00 |

OTHER PUBLICATIONS

Y. Yamamoto et al "A New Video Processor for Color TV" IEEE Transactions on Consumer Electronics, vol. 34, No. 3, Aug. 1, 1988, pp. 443–450.

M. Suzuki, "Computer–Controlled Alignment for a 2000–Line Color Monitor" 1989 SID International Symposium, Digest of Technical Papers, Oct. 31, 1989 pp. 196–199.

*Primary Examiner*—John Miller
*Assistant Examiner*—Brian Yenke
(74) *Attorney, Agent, or Firm*—Joseph S. Tripoli; Robert D. Shedd

(57) ABSTRACT

A method and apparatus within a television receiver for electronically aligning signals within the receiver by controlling support circuitry for an IF module. A video amplifier is coupled to an output of the IF module. A control voltage source (DAC 114) controls a DC level control circuit within the video amplifier (244) such that the video signal is amplified and DC level shifted to align the video signal with down stream circuitry.

9 Claims, 3 Drawing Sheets

U.S. PATENT DOCUMENTS

| | | |
|---|---|---|
| 3,636,462 A | 1/1972 | Baldauf, Jr. |
| 3,947,629 A | 3/1976 | Tanaka et al. |
| 4,118,731 A | 10/1978 | Hinn |
| 4,178,558 A | 12/1979 | Nagashima et al. |
| 4,184,176 A | 1/1980 | Sahara et al. |
| 4,293,875 A | 10/1981 | Katz |
| 4,383,273 A | 5/1983 | Lunn |
| 4,442,458 A | 4/1984 | Barter |
| 4,535,256 A | 8/1985 | Reneau |
| 4,675,726 A | 6/1987 | Leshko |
| 4,706,108 A | 11/1987 | Kumagai et al. |
| 4,727,336 A | 2/1988 | Mark |
| 4,757,239 A | 7/1988 | Starkey, IV |
| 4,930,004 A | 5/1990 | Yamamoto et al. |
| 4,991,023 A * | 2/1991 | Nicols ........................ 348/554 |
| 5,206,606 A | 4/1993 | Yamaguchi et al. |
| 5,282,039 A | 1/1994 | Vilard |
| 5,287,175 A * | 2/1994 | Fang ............................ 348/97 |
| 5,311,295 A | 5/1994 | Tallman et al. |
| 5,337,091 A * | 8/1994 | Harford et al. .............. 348/737 |
| 5,479,266 A | 12/1995 | Young et al. |
| 5,661,436 A | 8/1997 | Kresock |
| 5,694,084 A | 12/1997 | Sakurai |
| 5,737,035 A | 4/1998 | Rotzoll |
| 5,798,801 A * | 8/1998 | Skinner ....................... 348/645 |
| 5,841,488 A * | 11/1998 | Rumreich ................... 348/694 |
| 5,990,940 A * | 11/1999 | Hashimoto et al. ......... 348/184 |
| 6,219,107 B1 * | 4/2001 | Renner et al. .............. 348/678 |
| 6,226,037 B1 * | 5/2001 | Griepentrog ................ 348/379 |

* cited by examiner

VIDEO AMPLIFIER WITH INTEGRATED DC LEVEL SHIFTING

This application claims the benefit of U.S. provisional application serial No. 60/102,429 filed Sep. 30, 1998, which is hereby incorporated herein by reference, and which claims the benefit under 35 U.S.C. §365 of International Application PCT/US99/22759, filed Sep. 30, 1999, which was published in accordance with PCT Article 21(2) on Apr. 6, 2000 in English.

BACKGROUND OF THE DISCLOSURE

1. Field of the Invention

The invention relates to television receivers and, more particularly, the invention relates to a video amplifier for a television receiver.

BACKGROUND OF THE INVENTION

In modern television receivers, a microprocessor provides command and control information through an I²C bus interface to provide various control functions. The I²C bus is coupled to a module (an IF integrated circuit) comprising a tuner, IF, and stereo decoder. To achieve the best picture and sound performance, the microprocessor may control 8 or more alignment functions and various switch functions through the I²C bus interface. These functions provide factory alignment of various signal characteristics such as video output amplitude and dc-level, RF AGC delay threshold, and the like. Such electronic alignment is performed to ensure that a consistent picture quality between televisions occurs in retail show rooms; to ensure that consistent picture equality results between inputs of a television with multiple tuners or multiple auxiliary inputs; and to maintain signal levels within dynamic range limitations of the receiver circuitry.

U.S. Pat. No. 4,442,458 discloses an amplifier for driving a cathode ray tube (CRT). This device includes a first amplifier having an input terminal for receiving a video signal and an output terminal connected to the control grid of the CRT. A second amplifier is responsive to the cathode current of the CRT and provides an output which is combined with the output of the first amplifier. The first amplifier has a wider bandwidth and lower dynamic range than corresponding prior art amplifiers. The second amplifier has a higher dynamic range than the output signal of the first amplifier. As the outputs of the first and second amplifiers are combined, the dynamic ranges are added together thereby providing a wider bandwidth while maintaining the dynamic range of the output signal energizing the control grid at a desired range.

U.S. Pat. No. 4,706,108 discloses an automatic system for controlling the color gain, hue and white balance of a television monitor. The system includes a signal processor, a color CRT a reference signal memory and a signal control circuit connected to the signal processor and reference signal memory. The signal control circuit adjust the operation of the signal processor based on a standard television signal and reference signal from memory.

EP 0 359 493 A discloses a double display mode for differential gain that displays mirror image differential gain signals. A microprocessor controlled variable is added to the differential gain signals to bring one of two corresponding opposite extreme amplitude points of the differential gain signals into registration so they overlay each other. The microprocessor controller variable is then adjusted until the opposite corresponding extreme amplitude points of the differential gain signals overlay each other. The difference in value of the variable is then converted into a percentage gain differential value for display alphanumerically without the need for display graticules.

U.S. Pat. No. 5,311,295 discloses an RGB display of a transcoded serial digital video signal. The display is produced by converting the serial digital video signal to a parallel digital video signal, separating the digital luminance component signal and the two digital difference component signals from the parallel digital video signal. The digital luminance and color difference component signals are then converted into analog encoded color component signals. The analog encoded color component signals are then transcoded into RGB component signals and the RGB component signals are routed to a waveform display device.

One aspect of electronic signal alignment control that is not presently addressed in the art is the ability to control the DC level of a video signal that is produced by an IF integrated circuit. Such a signal alignment feature enables the IF integrated circuit to be matched to down stream circuits such that the IF integrated circuit can be used in a greater number of television receivers.

Therefore, there is a need in the television receiver art for an economical solution that enables a system microprocessor to control the DC level of a video signal.

SUMMARY OF THE INVENTION

The present invention is a method and apparatus within a television receiver for electronically aligning signals within the receiver by controlling the DC level of a video signal. The television receiver comprises a IF integrated circuit that provides a tuner, IF and stereo decoder. The invention uses a digital-to-analog converter (DAC) integrated circuit to control a DC level produced by a video amplifier that is coupled to the output of the IF integrated circuit. In one embodiment of the invention, a system microprocessor is coupled through an I²C bus to a DAC that controls the video amplifier. The video amplifier comprises a DC video level circuit that applies a DC level to the amplified video signal. Additionally, the video amplifier is a non-inverting amplifier such that the output of the IF integrated circuit is polarity matched to downstream circuitry.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1A:
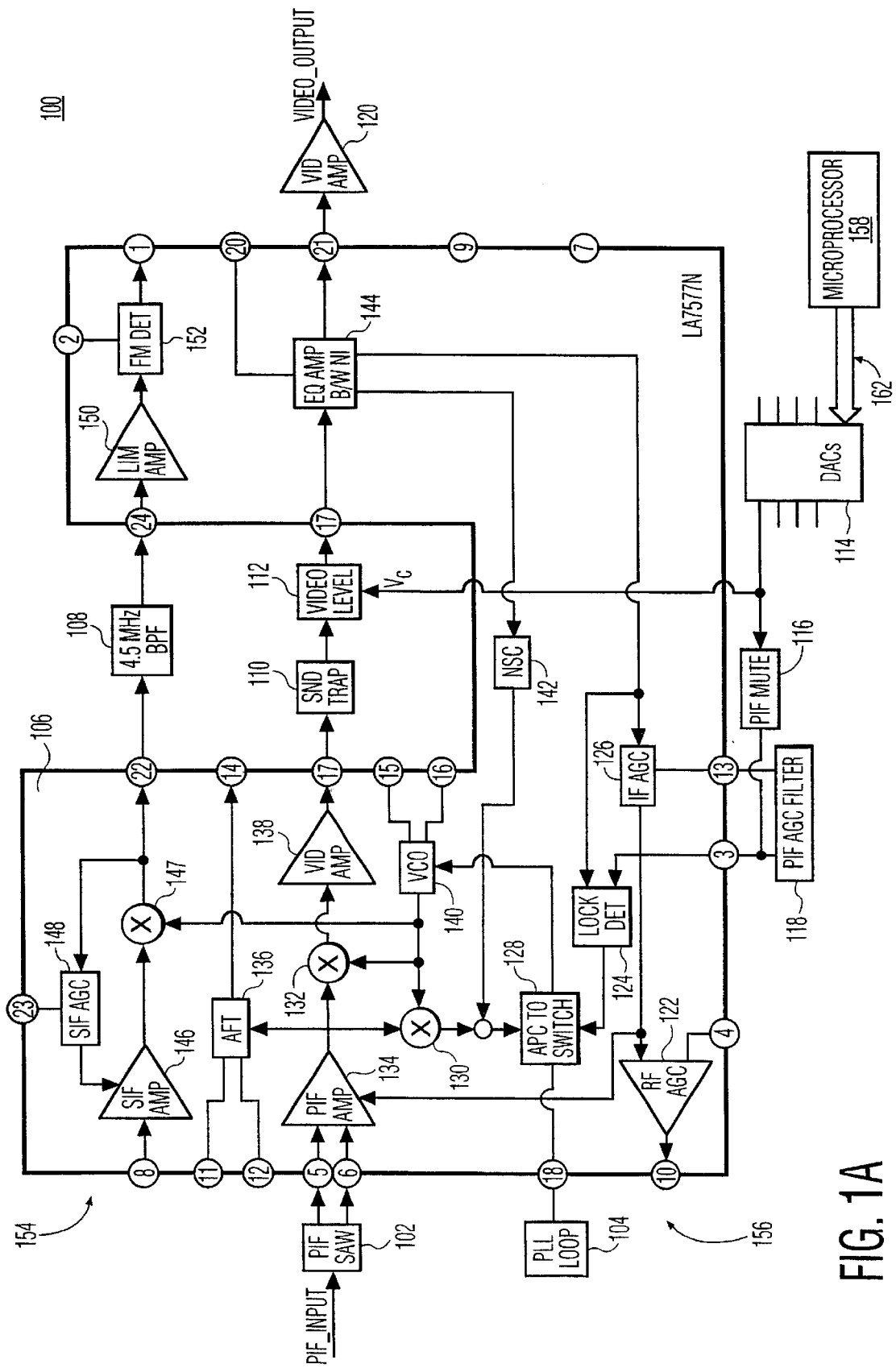
FIG. 1 depicts a portion of a television receiver that is arranged in accordance with the present invention.

FIG. 1 depicts a block diagram of a portion 100 of a television receiver comprising a signal processing module 106 as well as components of the present invention that support the operation of the module 106. The module 106 is known as an IF integrated circuit that performs video signal processing upon a television signal to produce a baseband video signal. The baseband video signal is amplified by a video amplifier 120 in accordance with the present invention. Specifically, the video amplifier 120 contains DC level shifting circuit that enables the DC level of the output video signal to be controlled by a system microprocessor 158 such that the video signal can be electronically aligned.

More specifically, the signal processing module 106 is, for example, a model LA7577N IF integrated circuit manufactured by Sanyo Corporation. The module 106 comprises an IF circuitry for both sound (SIF) and picture (PIF). The audio circuitry portion 154 of the module 106 comprises an SIF amplifier 146 and SIF AGC 148, down converter 147 (mixer), a limiting amplifier 150 and an FM detector 152. Supporting the audio circuitry 154 is a 4.5 MHz bandpass filter 108. The audio circuitry 154, although it is a part of the television receiver module 106, forms no part of the present invention.

The video portion 156 of the module 106 comprises a PIF amplifier 134, a video detector 132, a phase detector 130, a voltage controlled oscillator 140, an internal video amplifier 138, an equalization amplifier 144, a Nyquist slope canceller 142, an APC switch 128, a lock detector 124, and IF AGC circuit 126 and an RF AGC amplifier 122. Supporting the video portion 156 of the module 106 is a PIF saw filter 102, a phase lock loop filter 104, a PIF AGC filter 118 and an external video amplifier 120 at the output of the module 106, as well as a sound trap 110 and a video level circuit 112. The IF video input is coupled to the PIF SAW filter 102 that filters the video signal. The SAW filtered video is amplified in IF amplifier 134, then down converted to baseband using the video detector 132. The video detector 132 is driven by the voltage controlled oscillator (VCO) 140. The baseband video is amplified by internal video amplifier 138. The amplified signal is filtered by the sound trap 110 and applied to the input of the video level control circuit 112. The operation of the video level circuit affects the IF AGC 126 which in affects the gain of the PIF amplifier 134 and, thus, the video signal amplitude. The output of the video level control circuit 112 is applied to the equalization amplifier 144 to control the amplitude of the video signal. The output of the equalization amplifier 144 is further amplified by video amplifier 120 to form the video output signal. The output of the PIF AGC filter is coupled to the lock detector 124 that drives the APC switch 128. The APC switch 128 selects the mode of operation for the PLL loop filter, i.e., whether the filter is operated in broad band mode (used during signal acquisition) or narrow band mode (used after PLL lock). The system microprocessor 158 couples digital control signals to a plurality of DACs 114 (e.g., eight DACs in a single integrated circuit package such as a TDA8444 manufactured by Philips Corporation) that, in turn, control the operation of various aspects of the IF module 106 and, in particular, control the level circuit 112, the PIF mute 116, and the video amplifier 120.

It is important to note that the video level circuit within the IF AGC loop and the IF amplifier gain is set by detecting the sync-tip level. As such, a change in the DC level of the video signal, as performed by the level circuit 112, changes the sync-tip level and the IF AGC loop gain. Consequently, a change in DC level by the level circuit 112 controls the amplitude of the video signal. A detailed discussion of the level circuit 112 and the PIF mute circuit appears in PCT patent application Ser. No. US99/22760, filed simultaneously herewith, (Attorney Docket Number 89203) and incorporated herein by reference.

The specific interconnections shown in FIG. 1 are representative of the interconnections within the LA7577N module 106. Those skilled in the art will realize that the inventive use of the video amplifier 120 described in detail below could be used in many other video processing applications.

Figure 2:
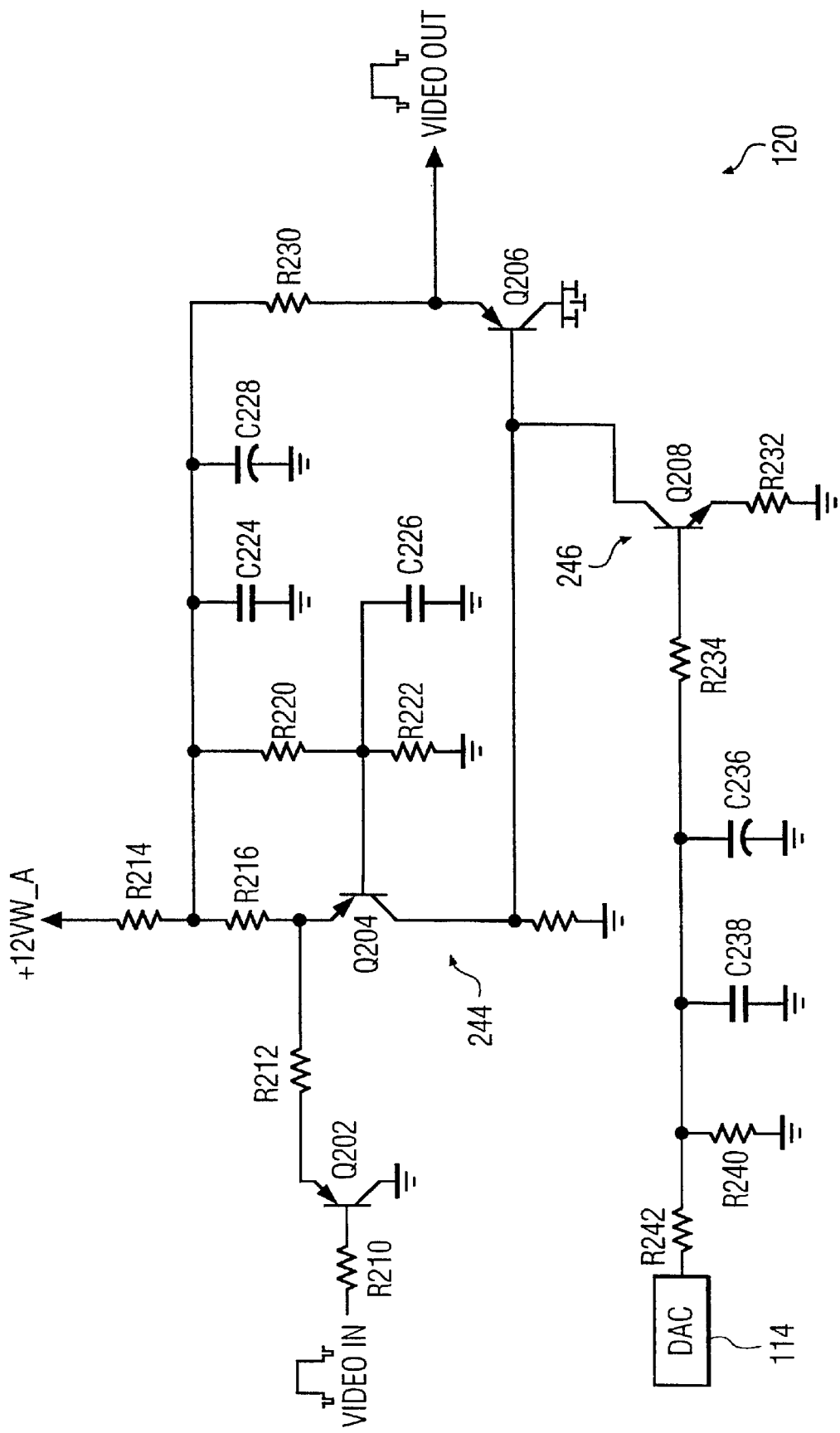
FIG. 2 is a schematic diagram of a non-inverting video amplifier with DC level control.

FIG. 2 depicts a schematic diagram of a non-inverting video amplifier 120 in accordance with the present invention. The video input signal is produced at the output pin 21 of the IF integrated circuit such as the LA7577 shown in FIG. 1. The video amplifier 120 is employed as the external video amplifier connected to the video output terminal of the IF integrated circuit. This amplifier provides both video signal amplification and DC level shifting of the amplified video signal.

The video signal is applied to resistor R210 that couples the signal to transistor Q202 (input buffer) Transistor Q206 forms an output buffer for the video amplifier 120. Resistor R214 capacitor C228, and capacitor C224 are used to filter the power supply voltage. Resistor R220 and resistor R222 set the base of transistor Q204 to a constant voltage above the maximum video input signal level. The amplifier voltage gain of the common base amplifier 244 (comprising transistor Q204, resistor R216, resistor R212, resistor R218, resistor R220, resistor R222 and capacitor C226) is equal to the ratio of R218/R212. The DC level of the video output signal is determined by the DC current through resistor R218, which is adjusted by stealing current with the constant current source of transistor Q208. The control voltage from a DAC 114 is attenuated and filtered by resistor R242 and R240, and capacitors C238 and C236. The filtered control signal is coupled to the amplifier 244 through a current source 246 comprising transistor Q208 and resistors R234 and R232.

Figure 3:
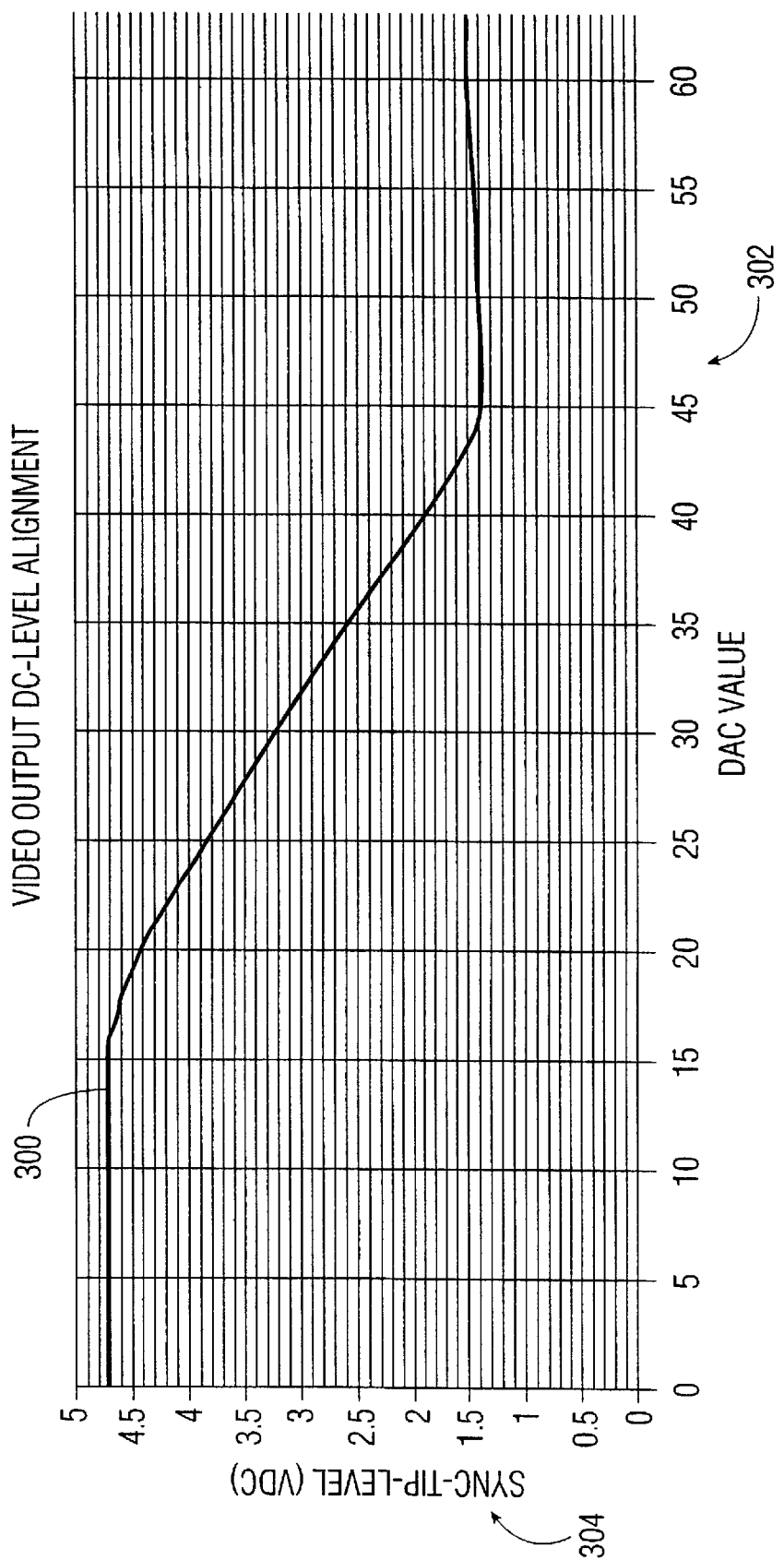
FIG. 3 is a graph of the video output sync-tip Dc level versus the register value of the DAC produced by the video amplifier of FIG. 2.

In operation, as the DAC output voltage increases, transistor Q208 collector current increases, the DC current through R218 decreases and thus the video output DC level decreases. The relationship 300 between the output DC voltage of the video amplifier in response to the DAC output voltage is depicted in FIG. 3, where the horizontal axis 302 is control voltage (DAC values) and the vertical axis 304 is the sync tip level voltage level (video DC level).

By way of example, the video input sync tip level production spread is 3.01 to 4.15 VDC, while the video output requirement is 2.5±0.5 VDC. The DC level adjustment was designed to set the video output sync tip level to 2.5±0.1 VDC. The desired amplifier gain was 1.65 which was achieved by setting R218 and R222 to 3300 and 2000 ohms, respectively.

The ratio of R220/R222 is set to equal the ratio of R222/R212 to optimize the power supply ripple rejection. If the two ratios are equal, the output is not affected by relatively small changes in the power supply voltage. This is important because the low pass filter formed by R214, C224 and C228 have little to no effect at very low frequencies. Although the output buffer Q206 is shown as an PNP transistor and NPN transistor could also be used. Lastly, C226 can be used to provide additional noise filtering and/or compensate for Q204 junction capacitance to improve the video bandwidth of the circuit.

The present invention provides circuitry that facilitates television receiver signal alignment using a system microprocessor to control the signal alignment operation through the system I²C bus. The circuitry includes a non-inverting video amplifier having a controlled DC level. As such, the inventive circuitry provides additional signal alignment functionality during factory alignment and testing through the television receiver system's existing microprocessor and I²C bus. The video amplifier amplifies in a non-inverting manner such that the output of the IF integrated circuit module, after amplification and level shifting, remains compatible with down stream circuitry that expects a certain polarity video signal.

Although various embodiments which incorporate the teachings of the present invention have been shown and described in detail herein, those skilled in the art can readily devise many other varied embodiments that still incorporate these teachings.

What is claimed is:

1. An apparatus for controlling a DC level of a video signal within a video signal receiver, said apparatus comprising:

a first amplifier for amplifying the video signal to produce a first amplified video signal;

a first DC level control coupled to the first amplifier and responsive to a first control signal for controlling a DC level of the first amplified video signal control means for providing the first control signal; and a second amplifier for amplifying the first amplified video signal to produce a second amplified video signal, wherein the second amplifier comprises:

an input buffer for producing a buffered signal in response to the first amplified video signal;

a non-inverting amplifier coupled to said input buffer for amplifying the buffered signal to produce the second amplified video signal; and a second DC level control circuit coupled to said non-inverting amplifier and responsive to a second control signal generated by the control means for controlling a DC level of the second amplified video signal for aligning the second amplified video signal with other signals within the receiver.

2. The apparatus of claim 1 wherein said non-inverting amplifier further comprises:

a transistor connected in a common-base configuration.

3. The apparatus of claim 2 wherein said transistor has a base connected to ground through a capacitor.

4. The apparatus of claim 2 wherein said transistor has an emitter coupled through a first resistor to said input buffer and a collector coupled through a second resistor to ground, where a first ratio of a value of said second resistor to a value of said first resistor establishes a gain of the non-inverting amplifier.

5. The apparatus of claim 2 wherein said transistor has a base and a third resistor coupled from said base to a power supply and a fourth resistor coupled from said base to ground, where a second ratio of said third resistor to said fourth resistor is equal to said first ratio.

6. The apparatus of claim 1 wherein said second DC level control circuit comprises:

a current source coupled to the non-inverting amplifier and responsive to the second control signal for controlling a current flowing through said second amplifier.

7. The apparatus of claim 1 wherein:

the first amplifier is included in an IF integrated circuit (106) and the first amplified signal is an output signal of the IF integrated circuit;

the second amplifier (120) is external to the IF integrated circuit; and the non-inverting amplifier (Q204) and the second DC level control circuit (Q208) included in the second amplifier operate in response to the second control signal for controlling the DC level and signal polarity of the second amplified signal for matching the IF integrated circuit to downstream circuits.

8. An apparatus for controlling a DC level of a video signal within a video signal receiver, said apparatus comprising:

an input buffer for receiving the video signal;

a non-inverting amplifier coupled to said input buffer for amplifying the video signal, said non-inverting amplifier including a transistor connected in a common-base configuration; and a DC level control circuit coupled to the first for controlling a DC level of the amplified video signal thereby aligning the video signal with other signals within the receiver, wherein said transistor has an emitter coupled through a first resistor to said input buffer and a collector coupled through a second resistor to ground, where a first ratio of a value of said second resistor to a value of said first resistor establishes a gain of the non-inverting amplifier.

9. The apparatus of claim 8 wherein said transistor has a base and a third resistor coupled from said base to a power supply and a fourth resistor coupled from said base to ground, where a second ratio of said third resistor to said fourth resistor is equal to said first ratio.

* * * * *